United States Patent
Rath et al.

(10) Patent No.: US 7,365,152 B2
(45) Date of Patent: Apr. 29, 2008

(54) METHOD FOR PRODUCING HIGHLY REACTIVE, LOW HALOGEN POLYISOBUTENES

(75) Inventors: Hans Peter Rath, Gruenstadt (DE); Thomas Perner, Esslingen (DE); Eckard Schauss, Heuchelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/584,138

(22) PCT Filed: Dec. 29, 2004

(86) PCT No.: PCT/EP2004/014793

§ 371 (c)(1), (2), (4) Date: Jun. 26, 2006

(87) PCT Pub. No.: WO2005/066220

PCT Pub. Date: Jul. 21, 2005

(65) Prior Publication Data

US 2007/0155930 A1  Jul. 5, 2007

(30) Foreign Application Priority Data

Dec. 30, 2003 (DE) ................ 103 61 633

(51) Int. Cl.
  *C08F 6/08*  (2006.01)
  *C08F 10/10*  (2006.01)

(52) U.S. Cl. ............ 528/482; 526/237; 585/525; 585/823

(58) Field of Classification Search ........ 528/482; 585/823, 525; 526/237
See application file for complete search history.

(56) References Cited

U.S. PATENT DOCUMENTS

| 3,862,900 | A | * | 1/1975 | Reusser ............... 208/262.1 |
| 4,547,620 | A | * | 10/1985 | Miyata et al. ......... 585/852 |
| 5,326,920 | A | * | 7/1994 | Ho et al. ............. 585/528 |
| 5,408,018 | A | * | 4/1995 | Rath ................. 526/237 |
| 6,441,110 | B1 | | 8/2002 | Sigwart et al. |

FOREIGN PATENT DOCUMENTS

| EP | 1 081 165 | 3/2001 |
| EP | 1 469 013 | 10/2004 |
| WO | 96 40808 | 12/1996 |
| WO | 99 31151 | 6/1999 |

OTHER PUBLICATIONS

Dr. Lothar Puppe, "Molekularsiebe" Ullmanns's Encyclopedia of Industrial Chemistry, vol. 17, pp. 9-17, 1983.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process is described for preparing polyisobutene having a low halogen content, in which isobutene is polymerized in the presence of a catalyst which comprises a halogenated Lewis acid, the catalyst is removed and/or deactivated, and the resulting polyisobutene is contacted with a zeolite of an average pore size of from 5 to 15 Å.

17 Claims, No Drawings

METHOD FOR PRODUCING HIGHLY REACTIVE, LOW HALOGEN POLYISOBUTENES

The invention relates to a process for preparing highly reactive polyisobutenes having a low halogen content.

What are known as highly reactive polyisobutenes are polyisobutenes having a high content of methylidene groups. In the context of the present application, methylidene groups refer to those double bonds whose position in the polyisobutene macromolecule is described by the general formula

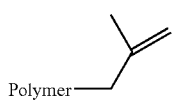

in which "Polymer" represents the polyisobutene radical shortened by one isobutene unit. The methylidene groups exhibit the highest reactivity, whereas the double bonds lying further toward the interior of the macromolecule, depending on their position in the macromolecule, exhibit only very low, if any, reactivity in functionalization reactions. The proportion of methylidene groups in the molecule is therefore the most important quality feature of the polyisobutenes. Uses of highly reactive polyisobutenes include as an intermediate for the preparation of additives for lubricants and fuels.

Highly reactive polyisobutenes can be obtained by polymerizing isobutene under catalysis by various Lewis acids. Particularly advantageous Lewis acids are halogenated, such as boron trifluoride or titanium tetrachloride.

However, the catalysis with halogenated Lewis acids often results in the side reaction of the addition of halogen to the polyisobutene or in the formation of halogenated by-products such as tertiary fluorides of isobutene and of its oligomers, some of which can only be removed from the polyisobutene with difficulty and contaminate it. When the polyisobutene is stored, especially under the influence of moisture, the halogenated by-products decompose to release hydrogen halide, such as hydrogen fluoride, which leads to corrosion on vessels, plant parts and the like.

It has also been observed that the content of methylidene groups in highly reactive polyisobutenes decreases in the course of storage, especially at elevated temperature. It is suspected that acidic contaminants and/or the released hydrogen halide bring about a double bond isomerization of methylidene double bonds to thermodynamically more stable internal double bonds.

EP-A 1 081 165 describes one means of reducing the halogen content of polyisobutene by treating it with alumina under conditions which substantially prevent double bond isomerization. The treatment is effected, for example, over a fixed alumina bed. It is postulated that the halogenated polyisobutene molecules are cleaved on the alumina surface to reform vinylidene groups.

The process entails high treatment temperatures of, for example, above 100° C. Such high temperatures are disadvantageous. In the polymerization of isobutene, volatile diluents such as $C_4$ hydrocarbons are frequently used. It is desirable to subject the solution of the polyisobutene in the volatile diluent obtained as a primary product directly to the cleavage treatment and to circumvent the requirement of isolating the polyisobutene and taking it up in a second, higher-boiling diluent. However, the handling of the polyisobutene solution obtained as the primary product at high temperatures is difficult and dangerous, since the diluents are inflammable and the vapor pressure of the solution rises sharply when it is heated.

At low treatment temperatures, the present inventors have found an initially good removal of halogen compounds; however, prolonged operation results in a "breakthrough" of halogenated compounds and the halogen contamination in effluate rises sharply. This suggests that the removal of halogen at low temperatures is based on a chromatography effect, by which halogenated polyisobutenes are retained more strongly by the alumina than nonhalogenated polyisobutenes. As soon as the "front" of the halogenated polyisobutene molecules reaches the outlet end of the adsorption bed, there is no longer any further halogen removal.

It is an object of the present invention to specify a process which does not have the disadvantages described, i.e. which is substantially not based on chromatography effects and in which a true cleavage of the halogenated isobutene molecules is effected at moderate temperatures, so that the process allows long-term operation of an adsorption bed without "breakthrough" of halogenated compounds.

This object is achieved by a process for preparing polyisobutene having a number-average molecular weight of from 400 to 50 000 and a content of methylidene groups of more than 50 mol %, in which a) isobutene is polymerized in the presence of a catalyst which comprises a halogenated Lewis acid,
b) the catalyst is removed and/or deactivated, and
c) the resulting polyisobutene is contacted with a zeolite of an average pore size of from 5 to 15 Å.

The expression "content of methylidene groups" relates to the percentage of polyisobutene molecules having a methylidene group, based on the number of all olefinically unsaturated polyisobutene molecules in a sample. It can be determined by $^1$H NMR and/or $^{13}$C NMR spectroscopy, as are familiar to those skilled in the art. The content of methylidene groups is more than 50 mol %, preferably at least 60 mol %, more preferably at least 75 mol %.

The polyisobutene obtained by the process according to the invention has a number-average molecular weight Mn of from 400 to 50 000, preferably from 500 to 5000, in particular from 700 to 2500. The dispersity (D=Mw/Mn) is typically less than 2.5, preferably less than 2.0 and in particular less than 1.8.

Owing to the high viscosity of the polyisobutenes, preference is given to not treating the polyisobutene with the adsorbent as such, but rather in the form of a solution in a diluent. The isobutene is generally polymerized in the presence of a diluent to obtain a solution of the polyisobutene in the diluent. The resulting solution of the polyisobutene is then further treated as described. Alternatively, before the contacting with the zeolite, the diluent can be fully or partly removed or replaced by isobutene oligomers. "Isobutene oligomers" are intended to refer to molecules formed predominantly from repeating isobutene units and having from 8 to 40 carbon atoms (corresponding to a molecular weight of from 112 to 560). Particularly appropriately, isobutene oligomers are used which are obtained in the distillative workup of isobutene polymers ("oligomer distillates").

For the contacting of the polyisobutene (unless evident otherwise from the context, "polyisobutene" is also intended to refer hereinbelow to the solution of the polyisobutene in a diluent) with the zeolite, all conceivable batchwise and continuous processes are suitable. For instance, the polyisobutene can be admixed with portions of the adsorbent, preferably under mechanical motion, and removed after a sufficient residence time, for example by filtration, decanting off or another suitable process. Appropriately, the zeolite is present in a fixed bed which is disposed in an adsorption column through which the polyisobutene is passed. The adsorption column is preferably arranged vertically and is flowed through by the stream in the direction of gravity or preferably against gravity. It is also possible to use a plurality of adsorption columns connected in series.

The treatment with the zeolite is effected generally at a temperature of from 5 to 100° C., preferably from 40 to 95° C.

Zeolites, which are also referred to as molecular sieves, are crystalline aluminosilicates which have a highly ordered structure with a rigid three-dimensional network of $SiO_4$ and $AlO_4$ tetrahedra which are joined by shared oxygen atoms. To compensate for the electronic valence of the aluminum-containing tetrahedra, the zeolites contain cations. The aluminum in the lattice of the zeolites may be fully or partly replaced by other elements such as B, Ga, Fe, Cr, V, As, Sb, Bi or Be, or mixtures thereof. The silicon may be replaced by another tetravalent element, for example Ge, Ti, Zr or Hf.

Zeolites may be prepared synthetically by known processes; cf., for example, Ullmanns Enzyklopädie d. Techn. Chemie [Ullmann's Encyclopedia of Industrial Chemistry], 4th ed., vol. 17, p. 9-17 (1983). The zeolites may be embedded into an oxidic binder matrix, for example of aluminum oxides, silicon dioxide, mixtures of highly disperse silicon dioxide and alumina, titanium dioxide, zirconium dioxide or clay, and shaped to shaped bodies such as extrudates, spheres or tablets.

In the process according to the invention, zeolites having average pore sizes of from 5 to 15 Å are used. The average pore size is laid down by the crystal structure and may be determined, for example, from X-ray structural data. It is difficult for the halogenated by-products to diffuse into zeolites having relatively small average pore sizes and they are therefore insufficiently cleaved/adsorbed. Zeolites having relatively large average pore sizes may lead to increased double bond isomerization of the polyisobutene, especially when they are activated by traces of hydrogen fluoride or water.

The zeolite is preferably substantially acid-free in order to prevent excessive double bond isomerization of the terminal methylidene double bonds of the polyisobutene to thermodynamically more stable double bonds in the interior of the macromolecule. Preference is therefore given to using non-activated zeolites, i.e. those which do not contain any protons to compensate for the negative charge of the structure. In general, commercial zeolites having basic pH values are available and contain alkali metal and/or alkaline earth metal cations for charge compensation. Such zeolites have high reserves of basicity.

Preferred zeolites are selected from zeolite A, zeolite L, zeolite X and zeolite Y. Particular preference is given to sodium zeolite A or sodium zeolite A in which all or some of the sodium ions have been replaced by magnesium and/or calcium ions. In the inventive zeolite treatment, it is suspected that the halogenated by-products are cleaved and the halogenated cleavage products such as hydrogen fluoride are adsorbed on the zeolite or chemically bound by the cations present. In order to prevent an undesired activation and/or structural change in the zeolite, preference is given to also binding hydrogen halide present in the reaction effluent and/or formed in the cleavage of the halogenated polyisobutenes by other acid scavengers.

In preferred embodiments, the polyisobutene is therefore also contacted with an acid scavenger which is selected from bases, nitrile compounds and immobilized bases. Preference is given to contacting with the acid scavenger before the zeolite treatment. The bases or nitrile compounds are metered in a suitable amount to the polyisobutene solution, for example in an amount of from 5 to 500 ppm. It is also possible to pretreat the zeolite with the base or nitrile compound. When an immobilized base is used, the polyisobutene (solution) can be passed over a bed of the immobilized base.

Suitable bases are ammonia, organic amines or polyamines or hydroxylamine. Examples of organic amines are methylamine, dimethylamine, ethylamine, diethylamine, triethylamine, propylamine, isopropylamine, diisopropylamine, 2-ethylhexylamine, diisobutylamine, sec-butylamine, tert-butylamine, tri-n-octylamine, di-2-ethylhexylamine, allylamine, diallylamine, triallylamine, aniline, benzylamine, ethylenediamine, hexamethylenediamine, tetramethylethylenediamine, diethylenetriamine, triethylenetetramine and tetraethylpentamine, 3-(methylamino)propylamine, 3-(dimethylamino)propylamine and 3-(dibutylamino)propylamine; oxyamines such as 3-methoxypropylamine, 3-ethoxypropylamine and 3-(2-ethylhexyloxy)propylamine; hydroxylamines such as N-methylethanolamine, N,N-dimethylethanolamine, N,N-diethylethanolamine, N,N-dibutylethanolamine, N-methyldiethanolamine, N-(2-aminoethyl)ethanolamine and 3-amino-1-propanol; and pyridines such as pyridine and 4-aminopyridine. In addition, amino acids such as β-alanine can be used. The list is not intended to be exhaustive.

Examples of nitrile compounds are acetonitrile, propionitrile and benzonitrile. "Immobilized base" refers to solid bases which are substantially insoluble in the polyisobutene or the polyisobutene solution or bases which are applied to an insoluble support, preferably a porous support. Insoluble bases include calcium carbonate, dolomite, magnesium oxide, zinc oxide. The porous support may be any solid support, such as alumina, activated carbon, silica gel, kieselguhr and the like.

Suitable for immobilization to a support are in particular hydroxides, oxides, carbonates, hydrogencarbonates and/or cyanides, especially of alkali metals such as sodium or potassium, alkaline earth metals such as magnesium or calcium, or zinc. The immobilization of the base on the support (also referred to as doping of the carrier with the base) is effected, for example, by impregnating the support with a solution of the base and drying. Particular preference is given to sodium hydroxide or potassium hydroxide and sodium cyanide or potassium cyanide.

The immobilized base is preferably selected from alumina and alumina which is doped with a base, especially an abovementioned hydroxide, oxide, carbonate, hydrogencarbonate and/or cyanide.

In a preferred embodiment, the polyisobutene is contacted successively with (i) an immobilized base, preferably at a temperature of from 5 to 40° C., and (ii) a zeolite of an average pore size of from 5 to 15 Å, preferably at a temperature of from 40 to 100° C.

The deactivation/removal of the catalyst is effected in many cases by treatment/extraction of the reaction effluent with water or an aqueous solution. It is advantageous to substantially remove the entrained water traces and to dry the polyisobutene (solution) before the zeolite treatment and to reduce the water content, for example, to less than 5 ppm, preferably less than 3 ppm. Preference is given to treating the polyisobutene (solution) in a suitable manner in order to promote the coalescence of the water phase still present, for example by means of filtration through a coalescing filter. In order to further reduce the water content, the polyisobutene can be contacted with a zeolite of an average pore size of 4 Å or less. Preference is given here to very low temperatures, preferably a temperature of less than 40° C., for example from 5 to 35° C.

In a preferred embodiment, the polyisobutene is therefore contacted successively with (i) a first zeolite of an average pore size of 4 Å or less, preferably at a temperature of from 5 to 35° C., and (ii) a second zeolite of an average pore size of from 5 to 15 Å, preferably at a temperature of from 40 to 100° C. To this end, a structured bed of two different zeolites or an arrangement of adsorption columns connected in series can appropriately be used. For instance, the stream is passed through one or more fixed beds which, upstream to the flow direction of the stream, comprise a zeolite having an average pore size of 4 Å or less and, downstream, a zeolite having an average pore size of from 5 to 15 Å.

In a particularly preferred embodiment, the polyisobutene is contacted successively with (i) an immobilized base, (ii) a first zeolite of an average pore size of 4 Å or less and (iii) a second zeolite of an average pore size of from 5 to 15 Å.

After the adsorbent treatment, the diluent and, where appropriate, the unconverted isobutene are removed, generally by distilling them off. The diluent which has been distilled off can be recycled into the polymerization reactor, preferably without further treatment.

After removal of the diluent, the residue which comprises the desired polyisobutene is worked up in a customary manner. Volatile oligomers of the isobutene are removed distillatively by customary methods together with diluent residues, for example at temperatures up to 230° C. under reduced pressure. Suitable apparatus are circulation evaporators, falling-film evaporators, thin-film evaporators, Sambay evaporators, annular-gap evaporators and the like.

The polymerization of isobutene is preferably effected in a continuous process. Measures for the continuous polymerization of isobutene in the presence of Lewis acids such as boron trifluoride and at least one cocatalyst in inert solvents to give polyisobutene are known per se. In a continuous process, a portion of the reaction mixture formed in the polymerization reactor is discharged continuously. An amount of starting materials corresponding to the discharge is fed continuously to the polymerization reactor and mixed with a circulated amount. The ratio of circulated amount to feed amount is generally in the range from 1000:1 to 1:1, preferably in accordance with the invention in the range from 500:1 to 5:1 and in particular in the range from 20:1 to 100:1 v/v. The average residence time of the isobutene to be polymerized in the polymerization reactor, which is determined by reaction volume and feed amount, may be from 5 seconds to several hours. Preference is given to residence times of from 1 to 30 min, in particular from 2 to 20 min. The polymerization of the isobutene is effected in the reactors customary for continuous polymerization, such as stirred tanks, plate heat exchangers, tubular, tube bundle and loop reactors, of which preference is given to loop reactors, i.e. tube (bundle) reactors having circulation and turbulent flow or internals such as static mixers, i.e. having stirred tank characteristics. Particularly favorable reactors are loop reactors having tube cross sections which lead to turbulent flow. It is possible to use reactors connected in series, in particular arrangements composed of main reactor and postreactor.

The polymerization is effected generally at a temperature in the range from −60° C. to +40° C., preferably less than 0° C., more preferably in the range from −5° C. to −40° C. and especially in the range from −10° C. to −30° C. The heat of polymerization is appropriately removed with the aid of a cooling apparatus. This may be operated, for example, with liquid ammonia as the coolant. Another possibility of removing the heat of polymerization is evaporative cooling. In this case, the heat being released is removed by evaporation of the isobutene and/or of other volatile constituents of the isobutene feedstock or of any volatile solvent. Preference is given to working in the polymerization process according to the invention under isothermal conditions, i.e. the temperature of the liquid reaction mixture in the polymerization reactor has a steady-state value and only changes to a slight extent, if at all, during the operation of the reactor.

The concentration of the isobutene in the liquid reaction phase is generally in the range from 0.2 to 50% by weight, preferably in the range from 0.5 to 20% by weight and in particular in the range from 1 to 10% by weight, based on the liquid reaction phase. In the case of the preparation of polyisobutenes having number-average molecular weights $M_n$ in the range from 500 to 5000, preference is given to working at an isobutene concentration in the range from 1 to 20% by weight and in particular in the range from 1.5 to 15% by weight. When an arrangement of main reactor and downstream postreactor is used, the concentrations specified apply to the main reactor. In the case of the preparation of polyisobutenes having a number-average molecular weight $M_n$ of more than 5000, preference is given to working at an isobutene concentration in the range from 4 to 50% by weight.

The isobutene conversion may in principle be set as desired. However, it is self-evident that the process is uneconomic at very low isobutene conversions, whereas the risk of double bond shifts becomes ever greater and shorter reaction times and improved heat removal become necessary at very high isobutene conversions of more than 99%. For these reasons, the isobutene conversion is typically conducted in the main reactor up to values in the range from 20% to 99%. Particular preference is given to isobutene conversions in the range from 70% to 98%.

Suitable feedstocks for the process according to the invention are both isobutene itself and isobutenic $C_4$ hydrocarbon streams, for example $C_4$ raffinates, $C_4$ cuts from isobutene dehydrogenation, $C_4$ cuts from steam crackers, FCC crackers (fluid catalyst cracking), as long as they have been substantially freed of 1,3-butadiene present therein. $C_4$ hydrocarbon streams suitable in accordance with the invention contain generally less than 1000 ppm, preferably less than 200 ppm, of butadiene. Typically, the concentration of butene-1, cis- and trans-butene-2 in the $C_4$ hydrocarbon streams is in the range from 40 to 70% by weight. Such $C_4$ hydrocarbon streams are preferred starting materials for the process according to the invention. When $C_4$ cuts are used as the starting material, the hydrocarbons other than isobutene assume the role of an inert diluent.

Suitable diluents or diluent mixtures for the process according to the invention are those which are inert toward the reagents used. Suitable diluents are saturated or unsaturated, aliphatic, cycloaliphatic and aromatic hydrocarbons, for example saturated hydrocarbons such as butane, pentane, hexane, heptane, octane, e.g. n-hexane, isooctane, cyclopentane, cyclohexane, methylcyclohexane, toluene or ethylbenzene; halogenated hydrocarbons such as methyl chloride, dichloromethane or trichloromethane, and mixtures of the aforementioned compounds. Before they are used in the process according to the invention, preference is given to freeing the solvents of impurities such as water, carboxylic acids or mineral acids, for example by adsorption on solid adsorbents such as activated carbon, molecular sieves or ion exchangers.

In the process according to the invention, the polymerization is carried out in the presence of a catalyst which comprises a Lewis acid such as boron trifluoride, $AlCl_3$, $TiCl_4$, $BCl_3$ or aluminum alkyl halides.

Particular preference is given to boron trifluoride complex catalysts. This refers to catalysts composed of boron trifluoride and at least cocatalyst. Suitable cocatalysts are generally oxygenous compounds. Suitable oxygenous compounds are, in addition to water, organic compounds having up to 30 carbon atoms which contain at least one oxygen atom bonded to carbon. Examples thereof are $C_1$-$C_{10}$-alkanols and -cycloalkanols, $C_2$-$C_{10}$-diols, phenol and alkylphenols, $C_1$-$C_{20}$-carboxylic acids, $C_4$-$C_{12}$-carboxylic anhydrides and $C_2$-$C_{20}$-dialkyl ethers. Preference is given among these to monohydric alcohols having from 1 to 20 carbon atoms, in particular having from 1 to 4 carbon atoms, which may optionally be used together with the $C_1$-$C_{20}$-dialkyl ethers. Preference is given in accordance with the invention to molar ratios of boron trifluoride to oxygenous compound in boron trifluoride complex catalysts in the range from 1:1 to 1:10, in particular in the range from 1:1.1 to 1:5 and especially in the range from 1:1.2 to 1:2.5. The $BF_3$ concentration in the reactor will generally be varied within the range from 0.01 to 1% by weight, based on the liquid reaction phase, in particular within the range from 0.02 to 0.7% by weight and especially within the range from 0.03 to 0.5% by weight.

The oxygenous compound in the boron trifluoride complex catalyst more preferably comprises at least one monohydric, secondary alcohol having from 3 to 20 carbon atoms. Examples of suitable secondary alcohols include the following: isopropanol, 2-butanol, and also sec-pentanols, sec-hexanols, sec-heptanols, sec-octanols, sec-nonanols, sec-decanols or sec-tridecanols. Apart from monohydric, secondary alcohols, it is also possible to use (poly)etherols of propene oxide and butene oxide. Preference is given to using 2-butanol and in particular isopropanol.

The boron trifluoride complexes may be preformed in separate reactors before they are used in the process according to the invention, temporarily stored after their formation and metered as required into the polymerization apparatus.

Another, preferred variant consists in generating the boron trifluoride complexes in situ in the polymerization apparatus. In this procedure, the particular cocatalyst is fed into the polymerization apparatus, if appropriate together with a solvent, and boron trifluoride in the required amount is dissolved, i.e. complexed, in this mixture of the reactants. In the course of this, the boron trifluoride and the catalyst are converted to the boron trifluoride complex. Instead of an additional solvent, it is possible in the case of the in situ generation of the boron trifluoride catalyst complex that isobutene or the reaction mixture of unconverted isobutene and polyisobutene function as the solvent.

Further suitable cocatalysts are tertiary chlorides which find use as initiators of living cationic polymerization, such as p-dicumyl chloride or m-dicumyl chloride. Combinations of $TiCl_4$ and tertiary chlorides have been found to be particularly useful.

The reaction mixture discharged from the polymerization reactor still contains polymerizable isobutene and catalyst. The polymerization therefore generally also continues in the effluent. This can result in disadvantageous changes with regard to molecular weight, molecular weight distribution and end group content in the polyisobutene formed in the polymerization reactor. In order to prevent a further reaction, the polymerization is typically terminated by deactivating the catalyst. The deactivation may be brought about, for example, by adding water, alcohols, acetonitrile, ammonia or aqueous solutions of mineral bases or by passing the effluent into one of the aforementioned media. Preference is given to deactivation with water or aqueous ammonia, which is carried out preferably at temperatures in the range from 1 to 60° C. (water temperature). The thus deactivated effluent is further treated in the above-described manner.

Boron trifluoride complex catalysts may also be removed substantially from the effluent and recycled into the polymerization reaction. The removal and recycling of the catalyst from the effluent of the polymerization reaction is disclosed by WO 99/31151, which is fully incorporated herein by reference. To remove the catalyst from the effluent, preference is given to using boron trifluoride complex catalysts having limited solubility and/or cooling the reaction mixture to temperatures of, for example, from 5 to 30 Kelvin below reactor temperature, preferably from 10 to 20 Kelvin below reactor temperature. In the case of the removal of the catalyst from the reactor effluent, it is recommended to lower the isobutene concentration in the effluent beforehand to values below 2% by weight, preferably 1% by weight and in particular below 0.5% by weight, based on the effluent. In general, the reactor effluent will therefore be subjected to a further polymerization stage before removal of the catalyst. The multistage polymerization of isobutene, described in WO 96/40808, in which the residual isobutene of the main reactor reacts down to about 0.5% in the postreactor, is therefore a preferred method for the process according to the invention. Preference is given to operating this second polymerization stage at the same temperature as the first polymerization stage or at a lower polymerization temperature than the first polymerization stage. In general, the temperature difference is from 0 to 20 Kelvin, preferably from 0 to 10 Kelvin.

The postreaction, especially the cooled postreaction, results in increased complex deposition. The solubility of the complex falls by at least a factor of 10, especially when a temperature reduction is also undertaken. In the course of this, the catalyst is obtained in the form of finely divided droplets which are generally converted rapidly to a coherent phase. The complex droplets and the coherent phase have a distinctly higher density than the polymer solution. They can therefore generally be removed with the aid of separators or other collecting vessels from the polymer-rich, low-catalyst product phase. The polymer-rich product phase removed is generally homogeneous and only contains small amounts of soluble catalyst fractions. These are deactivated in the above-described manner, preferably with water.

The invention is illustrated in detail by the examples which follow.

COMPARATIVE EXAMPLES 1 AND 2 AND EXAMPLE 3

A reactor was used which consisted of a Teflon hose of length 7.1 m and an internal diameter of 6 mm, through which 1000/h of reactor contents were conducted in circulation by a gear pump. Tube and pump had a capacity of about 200 ml. The Teflon hose and the pump head were disposed in a cold bath of −25° C. (cryostat). Through a capillary of internal diameter 2 mm, 700 g/h of a 50% by weight solution, precooled to −25° C. and dried to less than 3 ppm of water over 3 Å molecular sieve at a contact time of 10 min, of isobutene in hexane were fed in as the feed.

5.01 mmol/h of boron trifluoride, 8.0 mmol/h of methanol and 0.20 mmol/h of ethylhexanol were fed directly into the circulation on the suction side of the circulation pump. At an internal reaction temperature of −18° C., a steady-state isobutene concentration of 4.1% by weight was established.

Immediately after leaving the circulation, the reaction effluent was compressed through a steel capillary having an internal diameter of 1 mm and length 1 m which was disposed in a cold bath, then quenched with aliquots of water in a mixing pump.

After the phase separation, the organic phase was treated as follows:

In comparative examples 1 and 2, the organic phase was passed over $Al_2O_3$ at 75° C. In example 3, the organic phase was passed over $Al_2O_3$ which had been coated with 3% by weight of KOH (10° C.), then over 3 Å zeolite (10° C.; the water content of the organic phase after the treatment was less than 3 ppm) and finally over 10 Å zeolite at 75° C.

Degassing was effected at 210° C. and 2 mbar for 30 min. The number-average molecular weight was about 810; the polydispersity Mw/Mn about 1.65. The methylidene double bond and fluorine content of the resulting polyisobutene are reported in Table 1.

EXAMPLES 4 AND 5

The above procedure was repeated, except that a feed of the following composition was used:

| | |
|---|---|
| Isobutane | 3% by wt. |
| n-Butane | 14% by wt. |
| Isobutene | 28% by wt. |
| Butene-1 | 23% by wt. |
| cis-Butene-2 | 11% by wt. |
| trans-Butene-2 | 21% by wt. |
| Butadiene | 0.050% by wt. |

8.55 mmol/h of boron trifluoride, 15.75 mmol/h of methanol and 0.43 mmol/h of ethylhexanol were fed into the reactor.

In Example 4, the organic phase was treated with $Al_2O_3$ which had been coated with 3% by weight of KOH (10° C.), then with 3 Å zeolite (10° C.) and finally at 75° C. with 10 Å zeolite. In Example 5, the organic phase was passed over $Al_2O_3$ which had been coated with 2% by weight of KCN (10° C.), then, with addition of 100 ppm of acetonitrile, over 3 Å zeolite (10° C.) and finally at 75° C. over 10 Å zeolite which had been doped beforehand with 1% by weight of acetonitrile.

TABLE 1

| Ex. | Adsorbent | Residence time [min][3] | Vinylidene content [%] | | | | | Fluorine content [%][4] | | | | | |
|---|---|---|---|---|---|---|---|---|---|---|---|---|---|
| | | | Before contact | After cleavage | | | | Before contact | After cleavage | | | | |
| | | | | 50 h | 100 h | 400 h | 400) h[1] | | 50 h | 100 h | 100 h[1] | 400 h | 400 h[1] |
| Comp. 1 | $Al_2O_3$[2] | 60 | 88 | 85 | 85 | 86 | 83 | 80 | <1 | <1 | <1 | 9 | 13 |
| Comp. 2 | $Al_2O_3$[2] | 30 | 88 | 86 | 86 | — | — | 80 | <1 | 10 | 15 | — | — |
| 3 | $Al_2O_3$(KOH)/ 3 Å/10 Å zeolite | 6/4/20 | 88 | 87 | 87 | 87 | 87 | 80 | <1 | <1 | 1 | 1 | 3 |
| 4 | $Al_2O_3$(KOH)/ 3 Å/10 Å zeolite | 6/4/20 | 90 | 87 | 87 | 89 | 89 | 110 | 8 | 11 | 13 | 32 | 31 |
| 5 | $Al_2O_3$(KCN) + MeCN/ 3 Å/10 Å zeolite | 6/4/20 | 90 | 88 | 87 | 88 | 88 | 110 | 9 | 14 | 14 | 16 | 18 |

[1] Values of the 10th cycle. A cycle comprises 400 h of experimental time and 12 h of regeneration of the adsorbent in a nitrogen stream at 200° C.
[2] Activated alumina from Procatalyse, grade D, particle diameter from 2 to 5 mm
[3] Real residence time, based on the gap volume
[4] Fluorine contents of the PIB solution

What is claimed is:

1. A process for preparing polyisobutene having a number-average molecular weight of from 400 to 50 000 and comprising more than 50 mol % methylidene groups, comprising the following steps:
   a) isobutene is polymerized in the presence of a catalyst which comprises a halogenated Lewis acid, resulting in a polyisobutene,
   b) the catalyst is removed and/or deactivated, and
   c) the polyisobutene is contacted with a zeolite of an average pore size of from 5 to 15 Å.

2. The process according to claim 1, in which the isobutene is polymerized in the presence of a diluent to obtain a solution of the polyisobutene in the diluent, and the solution of the polyisobutene is contacted with the zeolite.

3. The process according to claim 1, wherein the polyisobutene is also contacted with at least one acid scavenger selected from the group consisting of: bases, nitrile compounds and immobilized bases.

4. The process according to claim 3, wherein the polyisobutene is contacted with at least one acid scavenger selected from the group consisting of the following bases: ammonia and organic amines.

5. The process according to claim 3, wherein the polyisobutene is contacted with at least one acid scavenger selected from the group consisting of the following nitrile compounds: acetonitrile, propionitrile and benzonitrile.

6. The process according to claim 3, wherein the polyisobutene is contacted with at least one acid scavenger selected from the group consisting of the following immobilized bases: alumina and alumina which is doped with hydroxides, oxides, carbonates, hydrogencarbonates and/or cyanides.

7. The process according to claim 1, wherein the water content of the polyisobutene is reduced to less than 10 ppm before the zeolite treatment.

8. The process according to claim 7, wherein the water content is reduced by contacting the polyisobutene with a zeolite of an average pore size of 4 Å or less.

9. The process according to claim 1, wherein the Lewis acid is boron trifluoride.

10. The process according to claim 2, in which the diluent comprises $C_4$ hydrocarbons other than isobutene.

11. The process according to claim 2, wherein the isobutene is polymerized in the presence of a diluent to obtain a solution of the polyisobutene in the diluent and, before the contacting with the zeolite, the diluent is removed fully or partly or replaced by isobutene oligomers.

12. The process according to claim 2, wherein the solution of the polyisobutene is also contacted with at least one acid scavenger selected from the group consisting of: bases, nitrile compounds and immobilized bases.

13. The process according to claim 12, wherein the solution of the polyisobutene is contacted with at least one acid scavenger selected from the group consisting of the following bases: ammonia and organic amines.

14. The process according to claim 12, wherein the solution of the polyisobutene is contacted with at least one acid scavenger selected from the group consisting of the following nitrile compounds: acetonitrile, propionitrile and benzonitrile.

15. The process according to claim 12, wherein the solution of the polyisobutene is contacted with at least one acid scavenger selected from the group consisting of the following immobilized bases: alumina and alumina which is doped with hydroxides, oxides, carbonates, hydrogencarbonates and/or cyanides.

16. The process according to claim 2, wherein the water content of the solution of the polyisobutene is reduced to less than 10 ppm before the zeolite treatment.

17. The process according to claim 16, wherein the water content is reduced by contacting the solution of the polyisobutene with a zeolite of an average pore size of 4 Å or less.

* * * * *